(12) United States Patent
Moon et al.

(10) Patent No.: US 10,203,117 B2
(45) Date of Patent: Feb. 12, 2019

(54) GAS OVEN

(71) Applicant: SAMSUNG ELECTRONICS CO., LTD., Suwon-si, Gyeonggi-do (KR)

(72) Inventors: Seong Cheol Moon, Gwacheon-si (KR); Sung Kwang Kim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 659 days.

(21) Appl. No.: 14/135,836

(22) Filed: Dec. 20, 2013

(65) Prior Publication Data

US 2014/0174301 A1 Jun. 26, 2014

(30) Foreign Application Priority Data

Dec. 21, 2012 (KR) .................. 10-2012-0150581

(51) Int. Cl.
*F24C 3/00* (2006.01)
*F24C 3/12* (2006.01)
(Continued)

(52) U.S. Cl.
CPC .............. *F24C 3/122* (2013.01); *A47J 37/00* (2013.01); *F16K 31/0648* (2013.01);
(Continued)

(58) Field of Classification Search
CPC . A47J 37/00; A47J 37/04; F24C 15/32; F24C 3/00; F24C 3/08; F24C 3/087
(Continued)

(56) References Cited

U.S. PATENT DOCUMENTS 2,597,266 A * 5/1952 Sherman .................. F24C 3/128
126/39 E
3,624,742 A * 11/1971 Hurko .................. F24C 15/2007
126/21 R
(Continued)

FOREIGN PATENT DOCUMENTS

DE 10 2007 039 379 A1 2/2009
EP 0 462 583 A2 6/1991
(Continued)

OTHER PUBLICATIONS

Extended European Search Report dated Apr. 25, 2016 in European Patent Application No. 13197010.5.
(Continued)

*Primary Examiner* — Dana Ross
*Assistant Examiner* — Ayub Maye
(74) *Attorney, Agent, or Firm* — Staas & Halsey LLP

(57) ABSTRACT

A gas oven having a gas supplying passage to supply gas to a burner is provided. The gas oven includes an ON/OFF valve to open/close the gas supplying passage, and a flow rate modulating valve connected to the ON/OFF valve in series so as to change the cross-sectional area of a passage, thereby supplying a proper amount of gas to a cooking cavity in response to the change of a cooking area. When a cooking cavity is divided into individual cooking cavities while a divider is mounted, the flow rate modulating valve is open/closed at a smaller opening degree than the maximum operating degree, and thus may be able to prevent a cooking substance from being carbonized in the individual cooking cavities.

14 Claims, 8 Drawing Sheets

(51) Int. Cl.
*F24C 3/08* (2006.01)
*A47J 37/00* (2006.01)
*F16K 31/06* (2006.01)
*F23N 1/00* (2006.01)
*F23N 5/02* (2006.01)
*F23N 5/04* (2006.01)

(52) U.S. Cl.
CPC ............ *F23N 1/002* (2013.01); *F23N 5/022* (2013.01); *F23N 5/042* (2013.01); *F24C 3/004* (2013.01); *F24C 3/087* (2013.01); *F24C 3/128* (2013.01); *F23N 2035/16* (2013.01); *F23N 2035/18* (2013.01); *F23N 2037/02* (2013.01); *F23N 2041/08* (2013.01)

(58) Field of Classification Search
USPC ............. 9/331; 126/39 R, 339, 19 R; 99/331
See application file for complete search history.

(56) References Cited

U.S. PATENT DOCUMENTS

| | | | | |
|---|---|---|---|---|
| 3,782,892 | A * | 1/1974 | Johnson | A21B 1/44 126/21 A |
| 4,457,291 | A * | 7/1984 | Henke | F23N 1/025 126/21 A |
| 4,830,333 | A * | 5/1989 | Watson | F16K 31/0658 251/129.18 |
| 6,056,000 | A * | 5/2000 | Santacatterina | F16K 31/0675 137/1 |
| 6,734,403 | B2 * | 5/2004 | Baker | F24C 7/087 219/391 |
| 6,957,666 | B2 * | 10/2005 | Phillips | F16K 1/40 137/870 |
| 7,183,520 | B2 * | 2/2007 | Park | F24C 15/322 126/333 |
| 7,467,639 | B2 * | 12/2008 | Watson | F23N 1/002 137/1 |
| 8,136,517 | B2 * | 3/2012 | Atkinson | F24C 3/128 126/39 E |
| 9,080,774 | B2 * | 7/2015 | Kim | F24C 3/087 |
| 9,097,429 | B2 * | 8/2015 | Nam | F24C 15/16 |
| 2003/0010221 | A1 | 1/2003 | Berger et al. | |
| 2007/0257020 | A1 | 11/2007 | Nam et al. | |
| 2010/0001087 | A1 * | 1/2010 | Gum | F23N 1/005 237/2 A |
| 2010/0132692 | A1 * | 6/2010 | Shaffer | A47J 37/0713 126/39 E |
| 2010/0176323 | A1 * | 7/2010 | Nguyen | F16K 11/24 251/129.15 |
| 2011/0048245 | A1 * | 3/2011 | Schjerven, Sr. | A21B 1/245 99/331 |
| 2011/0108017 | A1 * | 5/2011 | Todd | F24C 3/128 126/39 R |
| 2011/0132350 | A1 * | 6/2011 | Ryu | F24C 15/322 126/39 E |

FOREIGN PATENT DOCUMENTS

| | | |
|---|---|---|
| EP | 0 462 583 | 12/1991 |
| EP | 1 657 493 A1 | 5/2006 |
| EP | 1 994 827 A1 | 11/2008 |
| EP | 2 746 669 A2 | 6/2014 |
| FR | 2 629 182 A3 | 9/1989 |
| GB | 2 093 984 A | 9/1982 |
| GB | 2 289 329 A | 11/1995 |
| GB | 2 321 962 A | 8/1998 |

OTHER PUBLICATIONS

European Examination Report dated Feb. 22, 2017 in corresponding European Application No. 13 197 010.5.
European Office Action dated Sep. 21, 2016 in corresponding European Patent Application No. 13 197 010.5.
Intention to Grant dated Mar. 1, 2018, in corresponding European Patent Application No. 13 197 010.5, 39 pgs.
Korean Patent Office issued Office Action (Grounds for Rejection) in Korean Patent Application No. 10-2012-0150581 dated Sep. 18, 2018 (20 pages total).

* cited by examiner

GAS OVEN

CROSS-REFERENCE TO RELATED APPLICATIONS

This application is related to, and claims priority to, Korean Patent Application No. 10-2012-0150581, filed on Dec. 21, 2012, in the Korean Intellectual Property Office, the disclosure of which is incorporated herein by reference.

BACKGROUND

1. Field

Embodiments of the present disclosure relate to a gas oven configured to use a cooking cavity divided into a plurality of individual cooking cavities by use of a divider.

2. Description of the Related Art

A gas oven is an appliance, provided with a cooking cavity in which a food substance is accommodated, a burner configured to generate heat by combusting gas and air, a gas supplying passage configured to supply gas to the burner, and an ignition device configured to generate an arc, to cook the food substance accommodated in the cooking cavity by applying heat at high temperature.

At the gas supplying passage, a valve configured to shut off and allow the supply of gas to a burner may be provided. In general, one of a Bi-metal ON/OFF valve and a solenoid ON/OFF valve may be provided.

With a Bi-metal ON/OFF valve, since the Bi-metal may be needed to be sufficiently heated or cooled for the valve to open or close, the Bi-metal ON/OFF valve may be provided with an increased safety mechanism compared to a solenoid ON/OFF valve, while having relatively lower reactivity. The solenoid ON/OFF valve may be immediately open and/or shut off depending on whether a current is applied thereto. The solenoid ON/OFF valve may have superior reactivity when compared to the Bi-metal ON/OFF valve, while having relatively less safety.

A gas supplying passage, whether it is provided with the Bi-metal ON/OFF valve or the solenoid ON/OFF valve, may only be open or shut off and difficult to change a cross section thereof. Thus, in a case when a divider is mounted, for example, a cooking capacity and a cooking area is changed, the controlling of the amount of gas may be difficult to be properly adjusted.

SUMMARY

It is an aspect of the present disclosure to provide a gas oven provided with a valve system capable of properly responding to the change of a cooking area and reducing the difference in measured temperature while having enhanced safety.

Additional aspects of the disclosure will be set forth in part in the description which follows and, in part, will be obvious from the description, or may be learned by practice of the disclosure.

In accordance with an aspect of the present disclosure, a gas oven includes a body, a cooking cavity, a divider, a first burner, a second burner, a supply passage, an ON/OFF valve, a first flow rate modulating valve and a second flow rate modulating valve. The cooking cavity may be formed inside the body. The divider may be detachably mounted at the cooking cavity to divide the cooking cavity into a first individual cooking cavity at an upper portion of the body and a second individual cooking cavity at a lower portion of the body. The first burner may be provided at the first individual cooking cavity. The second burner may be provided at the second individual cooking cavity. The supply passage may be configured to supply gas to the first burner and the second burner from an outside gas supply source, the supply passage including a common passage connected to the outside gas supply source, and a first passage and a second passage that are diverged from the common passage to be connected to the first burner and to the second burner, respectively. The ON/OFF valve may be provided at the common passage. The first flow rate modulating valve may be provided at the first passage and capable of modulating an opening degree thereof. The second flow rate modulating valve may be provided at the second passage and capable of modulating an opening degree thereof.

Each of the ON/Off valve, the first flow rate modulating valve, and the second flow rate modulating valve may be a solenoid valve.

The gas oven may have a first mode during which the divider is mounted and only the first burner is operated, a second mode during which the divider is mounted and only the second burner is operated, a third mode during which the divider is mounted and the first burner and the second burner are simultaneously operated, a fourth mode during which the divider is separated and only the first burner is operated, a fifth mode during which the divider is separated and only the second burner is operated, and a sixth mode during which the divider is separated and the first burner and the second burner are simultaneously operated.

In the fourth mode and the fifth mode, the first flow rate modulating valve or the second flow rate modulating valve may be open/closed at a maximum opening degree, and in the first mode, the second mode, the third mode, and the sixth mode, the first flow rate modulating valve and the second flow rate modulating valve each may be open/closed at an opening degree smaller than the maximum opening degree.

During ignition of the first burner or the second burner, the first flow rate modulating valve or the second flow rate modulating valve may be open at an opening degree smaller than a maximum opening degree to prevent an explosive ignition.

After a temperature measured at the first individual cooking cavity or the second individual cooking cavity exceeds a predetermined temperature, an opening degree of the first flow rate modulating valve or the second flow rate modulating valve may be gradually shut off.

Each of the first flow rate modulating valve and the second flow rate modulating valve may include a coil, a plunger, a valve body, a restoring spring, and an adjustment unit. The coil may be wound in a form of a cylinder and configured to generate a magnetic field when applied with a current. The plunger may be configured to move downward by the magnetic field. The valve body may be configured to move downward while being pressed by the plunger to adjust an opening degree of a connecting hole that connects an inlet to an outlet according to an amount of movement thereof. The restoring spring may be configured to elastically support the valve body to restore a position of the valve body when the current applied to the coil is removed. The adjustment unit may be capable of adjusting a change of the opening degree according to a moving distance of the plunger by adjusting an initial position of the plunger.

The adjustment unit may include an adjustment bolt, an adjustment guide to which the adjustment bolt is coupled, and a buffer spring provided between the adjustment bolt and the plunger to change the initial position of the plunger according to an amount of the coupling of the adjustment bolt.

In accordance with an aspect of the present disclosure, a gas oven includes a body, a cooking cavity, a divider, a first burner, a second burner, a supply passage, a first ON/OFF valve, a first flow rate modulating valve, a second ON/OFF valve, and a second flow rate modulating valve. The cooking cavity may be formed at inside the body. The divider may be detachably mounted at the cooking cavity to divide the cooking cavity into a first individual cooking cavity at an upper portion of the body and a second individual cooking cavity at a lower portion of the body. The first burner may be provided at the first individual cooking cavity. The second burner may be provided at the second individual cooking cavity. The supply passage may be configured to supply gas from an outside gas supply source to the first burner and the second burner, the supply passage including a common passage connected to the outside gas supply source, and a first passage and a second passage that are diverged from the common passage to be connected to the first burner and the second burner, respectively. The first ON/OFF valve may be provided at the first passage. The first flow rate modulating valve may be provided at the first passage and capable of modulating an opening degree thereof. The second ON/OFF valve may be provided at the second passage. The second flow rate modulating valve may be provided at the second passage and capable of modulating an opening degree thereof.

Each of the first ON/Off valve, the first flow rate modulating value, the second ON/OFF valve and the second flow rate modulating valve may be a solenoid valve.

In accordance with an aspect of the present disclosure, a gas oven includes a body, a cooking cavity, a burner, a supply passage, an ON/OFF valve, and a flow rate modulating valve. The cooking cavity may be formed at inside the body. The burner may be provided at the cooking cavity. The supply passage may be configured to supply gas from an outside gas supply source to the burner. The ON/OFF valve may be provided at the supply passage and configured to open/shut off the supply passage. The flow rate modulating valve may be provided at the supply valve so as to be connected in series with the ON/OFF valve and capable of modulating an opening degree thereof.

Each of the ON/OFF valve and the flow rate modulating valve may be a solenoid valve.

During ignition of the burner, the flow rate modulating valve may be open at an opening degree smaller than a maximum opening degree to prevent explosive ignition.

After a temperature measured at the cooking cavity exceeds a predetermined temperature, the opening degree of the flow rate modulating valve may be gradually shut off.

In accordance with an aspect of the present disclosure, a flow rate modulating valve includes a coil, a plunger, a valve body, a restoring spring, and an adjustment unit. The coil may be wound in a form of a cylinder and configured to generate a magnetic field when applied with a current. The plunger may be configured to move downward by the magnetic field. The valve body may be configured to move downward while being pressed by the plunger and configured to modulate an opening degree of a connecting hole that connects an inlet to an outlet according to an amount of movement thereof. The restoring spring may be configured to elastically support the valve body to restore a position of the valve body when the current applied to the coil is removed. The adjustment unit may be capable of adjusting a change of the opening degree according to a moving distance of the plunger by adjusting an initial position of the plunger.

The adjustment unit may include an adjustment bolt, an adjustment guide to which the adjustment bolt is coupled, and a buffer spring provided between the adjustment bolt and the plunger to change an initial position of the plunger according to an amount of the coupling of the adjustment bolt.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
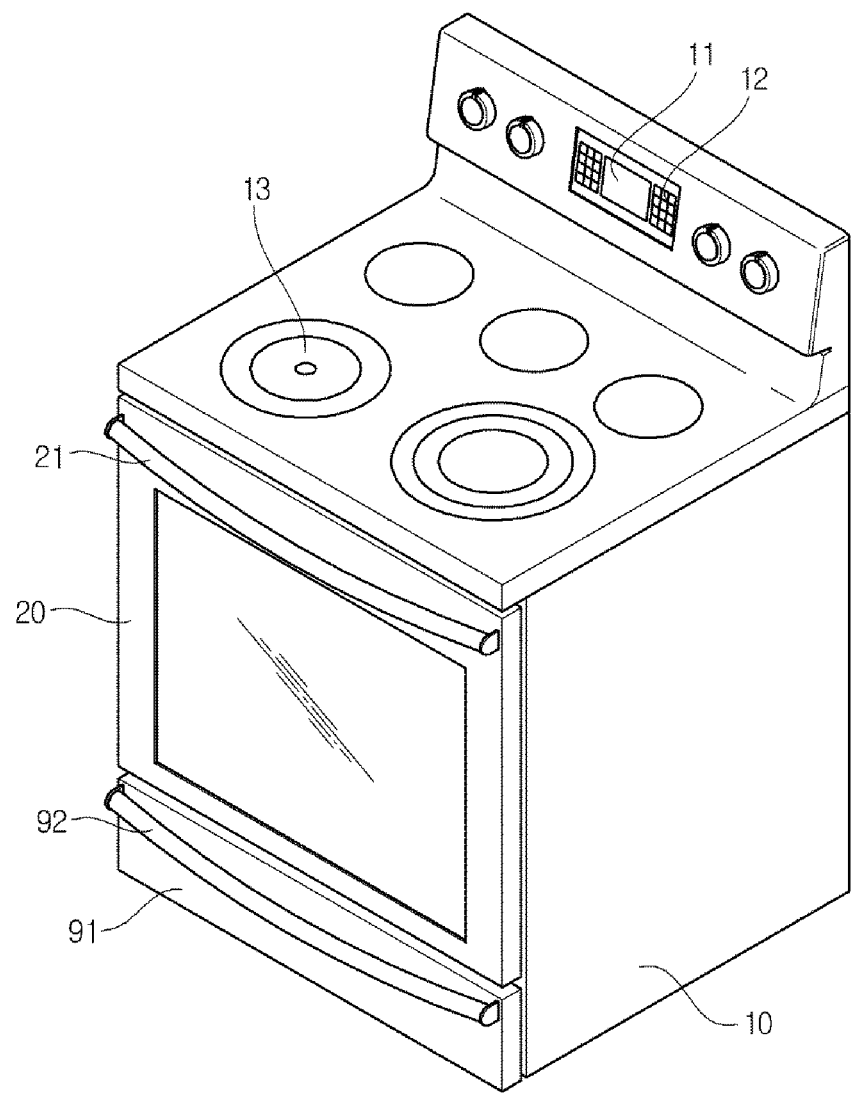
FIG. 1 illustrates an exterior appearance of a gas oven in accordance with an embodiment of the present disclosure.

Reference will now be made in detail to the embodiments of the present disclosure, examples of which are illustrated in the accompanying drawings, wherein like reference numerals refer to like elements throughout.

Figure 2:
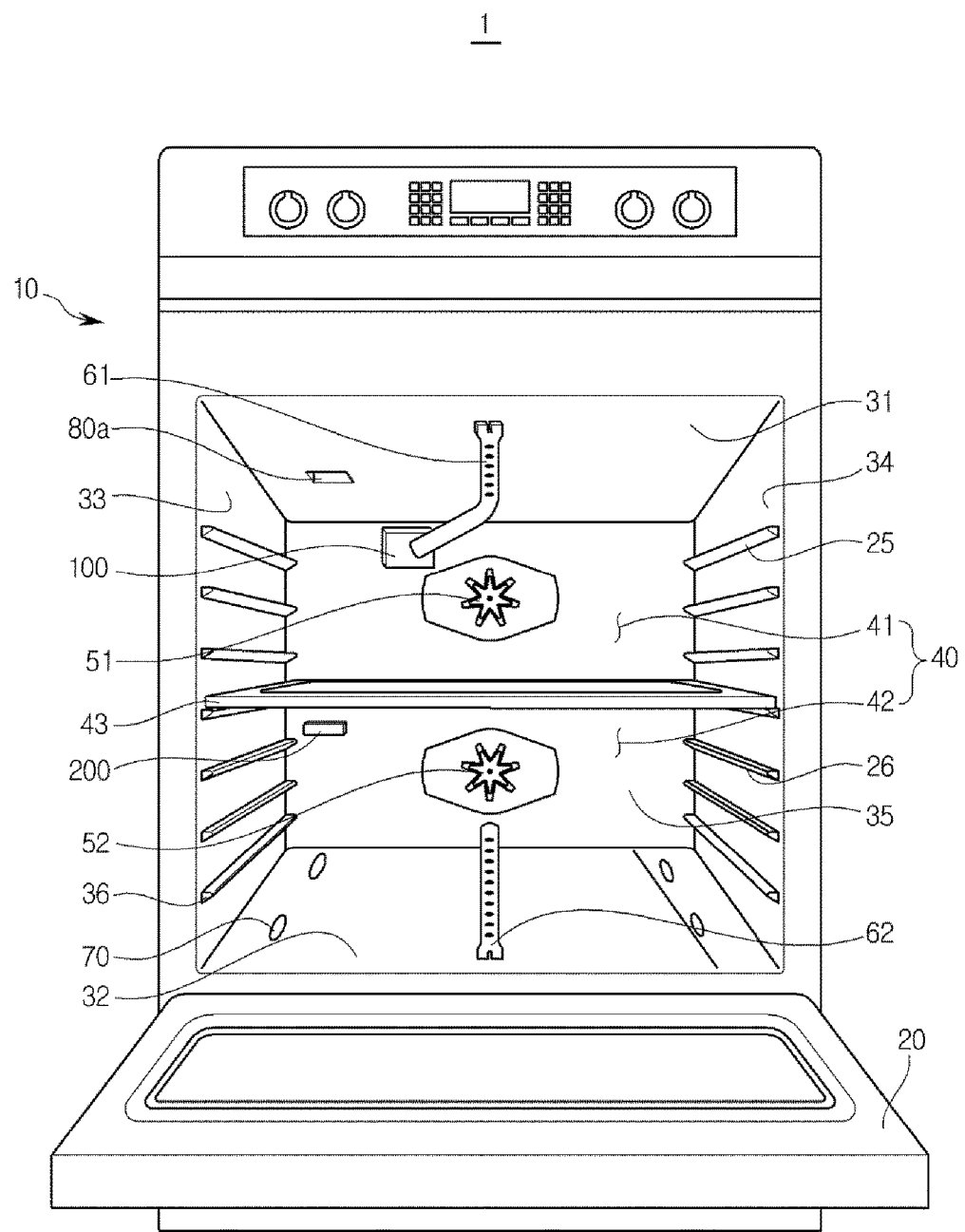
FIG. 2 illustrates an inside of an exemplary gas oven.
Figure 3:
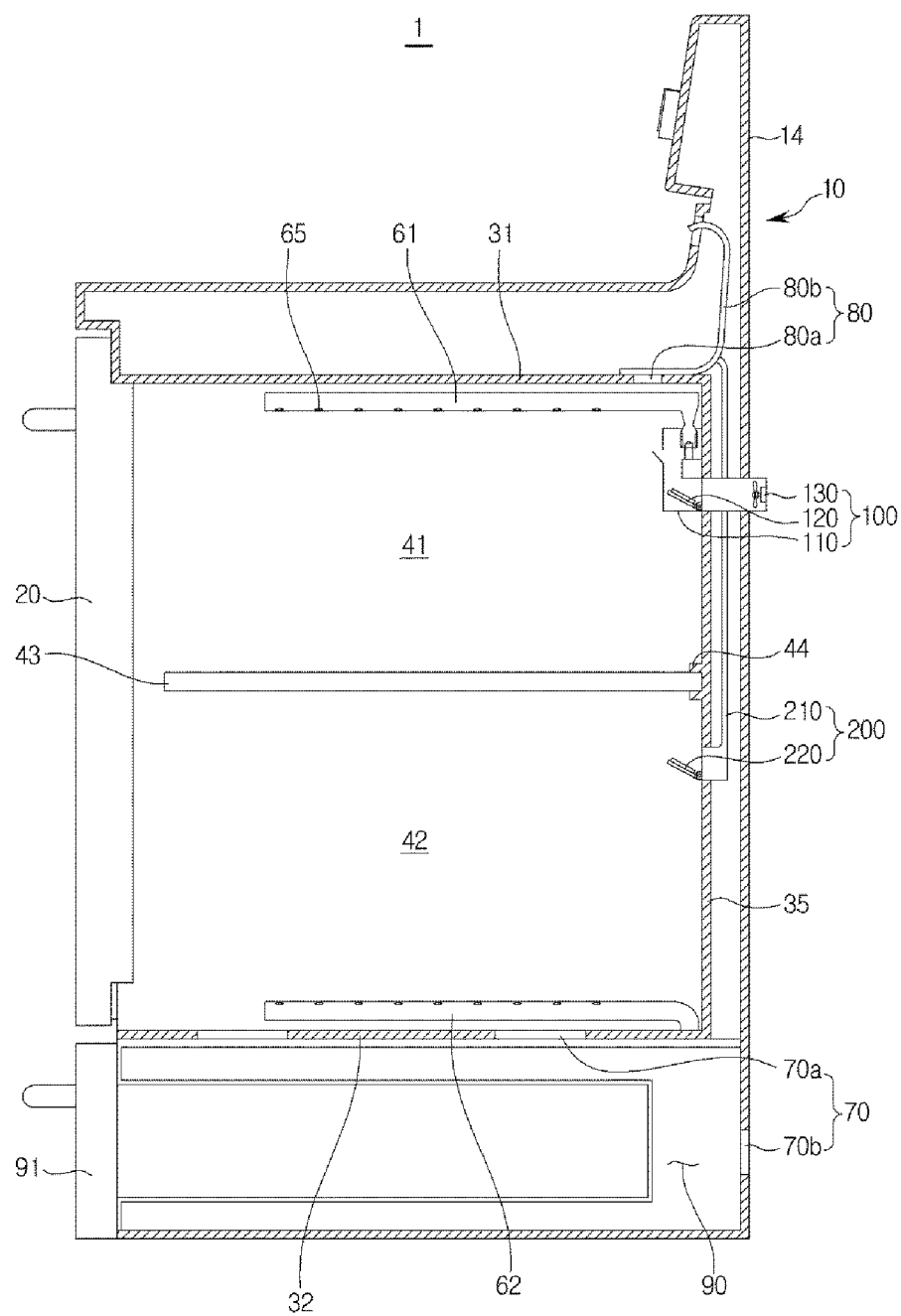
FIG. 3 is a schematic side cross-sectional view of an exemplary gas oven.

FIG. 1 illustrates an exterior appearance of a gas oven in accordance with an exemplary embodiment of the present disclosure, FIG. 2 illustrates an inside of a gas oven, and FIG. 3 is a schematic side cross-sectional view of a gas oven.

Referring to FIGS. 1 to 3, a gas oven 1 includes a body 10, a cooking cavity 40 provided at inside the body 10 to accommodate a food substance therein, a plurality of burners 61 and 62 to generate heat by combusting gas, and a plurality of convection fans 51 and 52 to convect air of the cooking cavity 40.

The cooking cavity 40 may be formed in the approximate shape of a box by an upper portion wall 31, a lower portion wall 32, a left side wall 33, a right side wall 34, and a rear wall 35, and may be provided with a front surface thereof open for the input/output of a cooking substance. The open front surface of the cooking cavity 40 may be open and closed by a door 20 hingedly coupled to the body 10 so as to be rotatable in an upper and lower side direction. At the door 20, a handle 21 may be provided.

At an upper end of the body 10, a cook top unit 13 at which a container filled with a food substance may be placed and heat is applied to the container, a display 11 to display various operational information of the gas oven 1, and a manipulation unit 12 capable of manipulating the operation of the gas oven 1 may be provided.

A plurality of supporters 36 to mount a rack (not shown), at which a food substance may be placed, thereon is provided at inside the cooking cavity 40. The plurality of supporters 36 may be protrudedly provided from the left side wall 33 and the right side wall 34.

At the plurality of supporters 36, a divider 43 capable of dividing the cooking cavity 40 may be detachably mounted. The divider 43 may be horizontally mounted at the cooking cavity 40 to divide the cooking cavity 40 into an individual cooking cavity at an upper portion 41 and an individual cooking cavity at a lower portion 42.

The individual cooking cavity at an upper portion 41 and the individual cooking cavity at a lower portion 42 are hereinafter referred to as a first individual cooking cavity 41 and a second individual cooking cavity 42, respectively. The first individual cooking cavity 41 and the second individual cooking cavity 42 are not necessarily needed to be the same size, and the size of the first individual cooking cavity 41 and the second individual cooking cavity 42 each may be different. The divider 43 may be provided with insulation material, and may insulate the first individual cooking cavity 41 from the second individual cooking cavity 42.

In the first individual cooking cavity 41, one of the plurality of burners 61 and 62 may be provided, and in the second individual cooking cavity 42, another one of the plurality of burners 61 and 62 may be provided. Hereinafter, the burner 61 provided at the first individual cooking cavity 41 is referred to as the first burner 61, and the burner 62 provided at the second individual cooking cavity 42 is referred to as the second burner 62. Thus, the first burner 61 may radiate heat to the first individual cooking cavity 41, and the second burner 62 may radiate heat to the second individual cooking cavity 42.

In the first individual cooking cavity 41, a convection fan 51 of the plurality of convection fans 51 and 52 may be provided, and at the second individual cooking cavity 42, another convection fan 52 of the plurality of convection fans 51 and 52 may be provided. Thus, the convection fan 51 may convect the air of the first individual cooking cavity 41, and the convection fan 52 may convect the air of the second individual cooking cavity 42.

At a lower side of the cooking cavity 40, a storage compartment 90 configured to store cookware may be provided. The storage compartment 90 may be open and closed by a drawer 91 configured to be inserted into and withdrawn from in a sliding manner. At the drawer 91, a handle 92 may be provided.

The gas oven 1 may be provided with a main air supplying passage 70 configured to provide the second individual cooking cavity 42 with a passage outside the body 10 to supply air to the second individual cooking cavity 42. For combustion to take place, gas, air and arc are needed, and through the main air supplying passage 70, air for combustion may be supplied to the second individual cooking cavity 42. The main air supplying passage 70 may be formed by a penetrating hole 70a passing through the lower portion wall 32, the storage compartment 90, and a through hole 70b being formed through the rear wall 35.

The main air supplying passage 70, in a case when the divider 43 is mounted at the cooking cavity 40, may be able to supply air to the second individual cooking cavity 42, and in a case when the divider 43 is separated from the cooking cavity 40, the main air supplying passage 70 may be able to supply air to the entire area of the cooking cavity 40.

The gas oven 1 may be provided with a main air discharging passage 80 configured to communicate the first individual cooking cavity 41 with an outside the body 10 to discharge waste gas of the first individual cooking cavity 41. The waste gas may be referred to as the combustion gas that is generated after combustion. In a case when gas is completely combusted, carbon monoxide and vapor are generated. In a case when gas is not completely combusted, carbon monoxide, hydrogen and sulfur may be generated. When the waste gas as such is remained without being discharged, incomplete combustion is generated at the burner, and thus waste gas is needed to be discharged to an outside.

The main air discharging passage 80 may be formed by an air discharging hole 80a passing through the upper portion wall 31 and an air discharging duct 80b communicating the air discharging hole 80a with an outside the body 10.

The main air discharging passage 80, in a case when the divider 43 is mounted at the cooking cavity 40, may be able to discharge waste gas of the first individual cooking cavity 41, and in a case when the divider 43 is separated from the cooking cavity 40, the main air discharging passage 80 may be able to discharge waste gas of the entire area of the cooking cavity 40.

The gas oven 1 may be provided with an auxiliary air supplying device 100 configured to supply air to the first individual cooking cavity 41 naturally or forcedly. The auxiliary air supplying device 100 may be configured to supply air to the first individual cooking cavity 41 in a case when the divider 43 is mounted at the cooking cavity 40.

In a case when the divider 43 is mounted at the cooking cavity 40, the air being supplied to the second individual cooking cavity 42 through the main air supplying passage 70 may be blocked from being moved to the first individual cooking cavity 41.

Furthermore, the auxiliary air supplying device 100, in a case when the first burner 61 and the second burner 62 are simultaneously operated, supplies air to the first individual cooking cavity 41. The auxiliary air supplying device 100 may forcedly supply air to the first individual cooking cavity 41, and in an aspect as such, the auxiliary air supplying device 100 may be referred to as a forced air supplying device 100.

The auxiliary air supplying device 100 may include an auxiliary air supplying passage 110 configured to connect the first individual cooking cavity 41 with an outside the body 10, an air supplying damper 120 to open/close the auxiliary air supplying passage 110, and an air supplying fan 130 configured to forcedly move the air at an outside the cooking cavity 40 to the first individual cooking cavity 41 through the auxiliary air supplying passage 110.

The air supplying fan 130, by forcedly sucking the air of an outside the cooking cavity 40, moves the air to inside the first burner 61 or to the surroundings of the first burner 61. The air supplying fan 130 may forcedly move air so as to have the first burner 61 and the second burner 62 operate in a simultaneous manner.

Since, in a case when the first burner 61 and the second burner 62 simultaneously operate, the waste gas generated from the second burner 62 may ascend to move to the surroundings of the first burner 61, and by the waste gas introduced to the surroundings of the first burner 61, incomplete combustion may occur at the first burner 61. That is, the supply of the second air to the first burner 61 may become difficult due to the waste gas of the second burner 62.

In a case when the divider 43 is mounted at the cooking cavity 40, a forced supply of air may be needed by the air supplying fan 130. When the divider 43 is mounted at the cooking cavity 40, the waste gas of the second burner 62 may be introduced to the surroundings of the first burner 61 through a gap between the divider 43 and the door 20 and a gap between the divider 43 and the both side walls 33 and 34 (see, for example, FIG. 2), as well as through a gap between the divider 43 and the rear wall 35.

When the divider 43 is separated from the cooking cavity 40 and when one of the first burner 61 and the second burner 62 are operated, the air supplying damper 120 needs to shut off the auxiliary air supplying passage 110. This is because, in the case as such, the supplying of air to the cooking cavity 40 takes place through the main air supplying passage 70 and the discharging of the waste gas of the cooking cavity 40 may take place through the main air discharging passage 80. When the auxiliary air supplying passage 110 is open, a high-temperature waste gas of the cooking cavity 40 may be excessively discharged.

When the gas oven 1 performs a self-cleaning at a high temperature, the air supplying damper 120 may need to shut off the auxiliary air supplying passage 110.

The gas oven 1 may be provided with an auxiliary air discharging device 200 configured to discharge waste gas of the second individual cooking cavity 42. The auxiliary air discharging device 200 may be configured to discharge waste gas of the second individual cooking cavity 42 when the divider 43 is mounted at the cooking cavity 40.

When the divider 43 is mounted at the cooking cavity 40, the waste gas of the second individual cooking cavity 42 may not be able to be discharged through the main air discharging passage 80.

The auxiliary air discharging device 200 may include an auxiliary air discharging passage 210 configured to connect the second individual cooking cavity 42 to outside the cooking cavity 40, and an air discharging damper 220 configured to open and close the auxiliary air discharging passage 210.

The auxiliary air discharging passage 210 may join the main air discharging passage 80 while being vertically extended at a space between the rear wall 35 of the cooking cavity 40 and an outside case 14 of the body 10. The auxiliary air discharging passage 210 may be independently extended to an outside the body 10 without joining the main air discharging passage 80. The waste gas of the second individual cooking cavity 42 may be discharged outside of the body 10.

When the divider 43 is separated from the cooking cavity 40, the air discharging damper 220 may need to shut off the auxiliary air discharging passage 210. The waste gas of the cooking cavity 40 may be discharged through the main air discharging passage 80, and when the auxiliary air discharging passage 210 is open, the high-temperature waste gas of the cooking cavity 40 may be excessively discharged through the auxiliary air discharging passage 210.

When the gas oven 1 performs a self-cleaning at a high temperature, the air discharging damper 220 may need to shut off the auxiliary air discharging passage 210.

Figure 4:
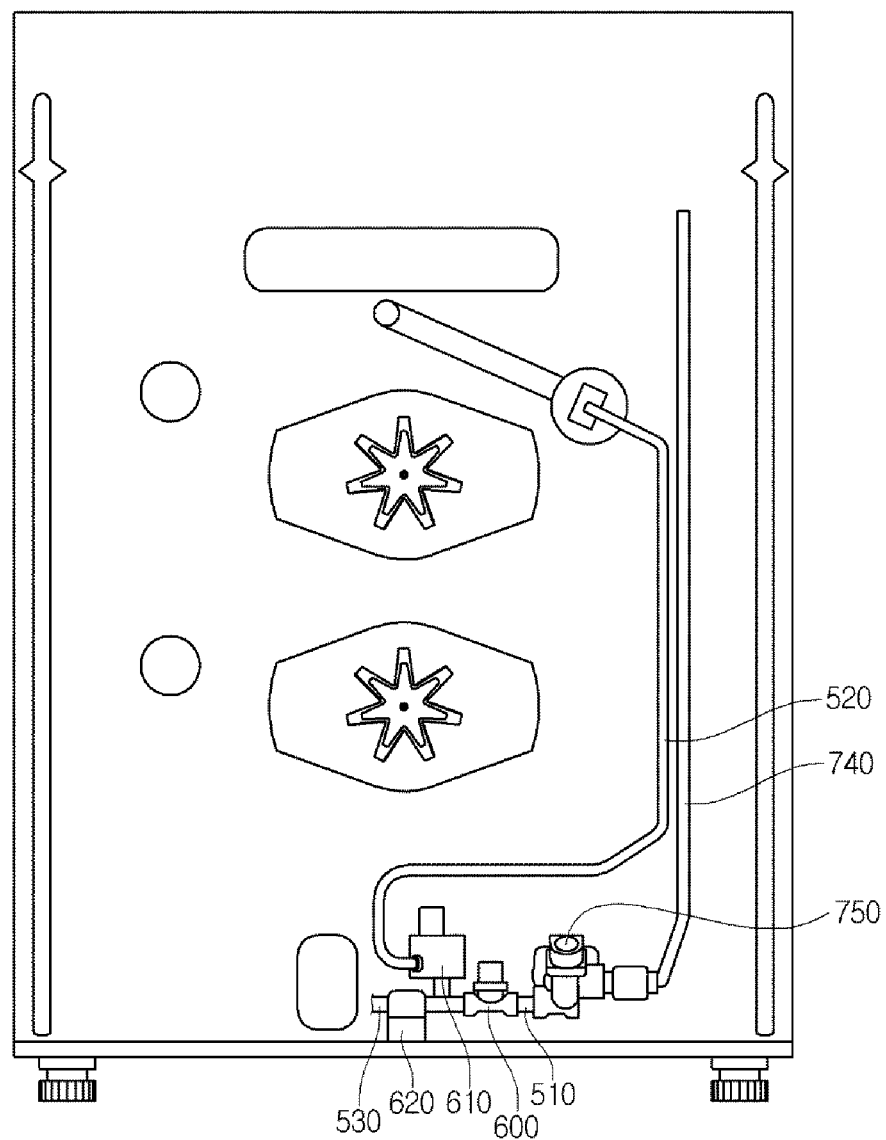
FIG. 4 illustrates an exemplary gas supplying passage of a gas oven.
Figure 5:
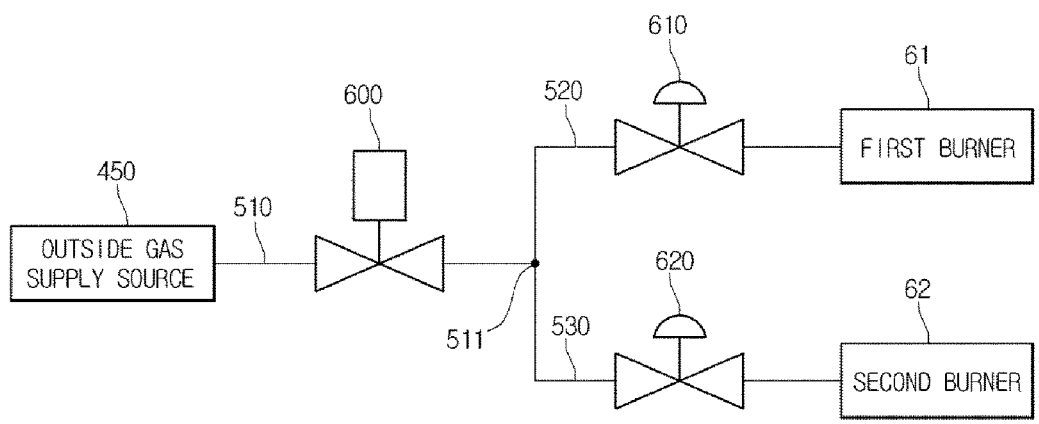
FIG. 5 illustrates an exemplary flow of a gas supply of a gas oven.
Figure 7:
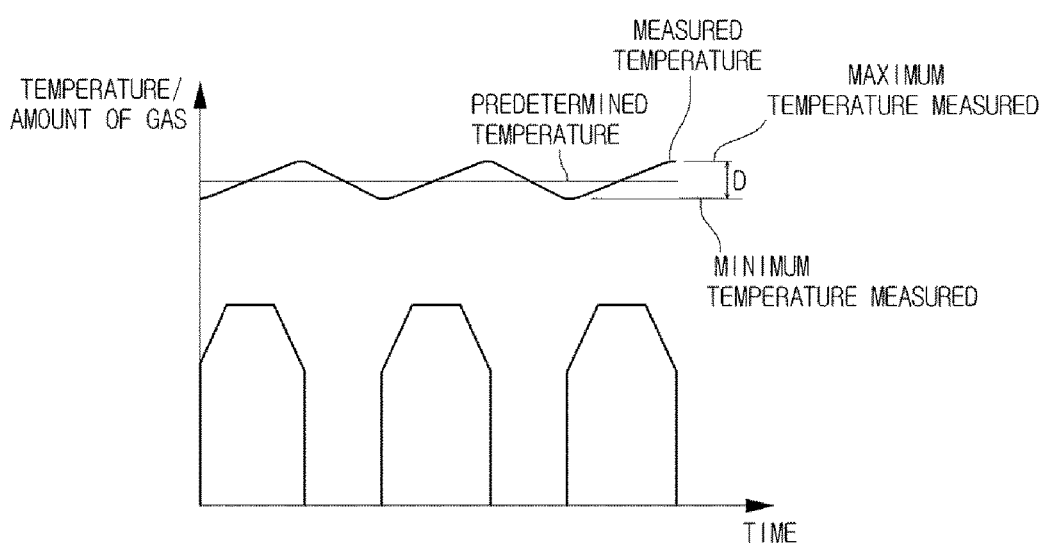
FIG. 7 illustrates an exemplary difference in a measured temperature of the gas oven according to time.

FIG. 4 illustrates a gas supplying passage of the gas oven, FIG. 5 illustrates a flow of the gas supply of the gas oven, and FIG. 7 illustrates a difference in the measured temperature of the gas oven according to time.

Referring to FIGS. 4 and 5, a gas supplying passage and a valve system of the gas oven 1 of an exemplary embodiment are described.

The gas supplying passage may include a common passage 510 connected to an outside gas supply source 450, a first passage 520 connected to the first burner 61 while being diverged from the common passage 510, a second passage 530 connected to the second burner 62 while being diverged from the common passage 510, a cook top gas supplying passage 740 (see, for example, FIG. 4) connected to the cook top unit 13 while being diverged from the common passage 510.

At a rear of the gas oven 1, an outside gas connecting hole 750, to which a hose being connected to the outside gas supply source 450 may be connected, may be provided.

At the common passage 510, an ON/OFF valve 600 configured to allow or shut off the supply of gas may be provided, and a first flow rate modulating valve 610 and a second flow rate modulating valve 620, each capable of modulating an opening degree thereof, may be provided at the first passage 520 and the second passage 530, respectively.

The modulating of the opening degree may be referred to as the modulating of the flow rate of gas through the change of the cross-sectional area of a flow passage. Thus, when compared to the ON/OFF valve capable of controlling the total flow during a certain time period through an ON/OFF control according to time, the flow rate modulating valve may be able to perform not only the ON/OFF controlling as the above but also modulate the flow of gas through the change of the cross-sectional area of the flow. Thus, the flow rate modulating valve may be able to perform the controlling of the flow rate more immediately and easily than the ON/OFF valve.

The ON/OFF valve 600, the first flow rate modulating valve 610, and the second flow rate modulating valve 620 may be controlled independent of one another. The ON/OFF valve 600, the first flow rate modulating valve 610, and the second flow rate modulating valve 620 may be solenoid valves.

The first flow rate modulating valve 610 and the ON/OFF valve 600 may be connected to each other in series. When the supply of gas to the first individual cooking cavity 41 needs to be shut off, by shutting off the ON/OFF valve 600 and the first flow rate modulating valve 610 simultaneously, the risk of an accident as a result of a malfunction of the valve may be effectively prevented.

The second flow rate modulating valve 620 and the ON/OFF valve 600 may be connected to each other in series, and thus, in a case when the supply of gas to the second individual cooking cavity 42 needs to be shut off, by shutting off the ON/OFF valve 600 and the second flow rate modulating valve 620 simultaneously, the risk of an accident as a result of a malfunction of the valve may be effectively prevented.

With respect to a gas oven 1 in accordance with an embodiment of the present disclosure, the divider 43 may be mounted thereto or separated therefrom, and thus depending on whether or not the divider 43 is mounted, the cooking area may be changed.

That is, the cooking area is decreased in individual cooking cavities 41 and 42, in a case when the divider 43 is mounted as compared to the cooking cavity 40 in a case when the divider 43 is not mounted. When the cooking area is decreased, a phenomenon that a food substance is carbonized may occur when a same amount of gas is supplied.

When the cooking area is increased, a phenomenon that a food substance is undercooked may occur. Thus, in the case when the cooking area is changed, to prevent the phenomenon of having a food substance carbonized or undercooked, the amount of gas being supplied needs to be modulated.

The gas oven 1 in accordance with an embodiment of the present disclosure, by using the flow rate modulating valves 610 and 620 may effectively respond to the change of a cooking area.

As an example, the gas oven 1 in accordance with an embodiment of the present disclosure has a first mode during which the divider 43 is mounted and only the first burner 61 is operated, a second mode during which the divider 43 is mounted and only the second burner 62 is operated, a third mode during which the divider 43 is mounted and the first burner 61 and the second burner 62 are simultaneously operated, a fourth mode during which the divider 43 is separated and only the first burner 61 is operated, a fifth mode during which the divider 43 is separated and only the second burner 62 is operated, and a sixth mode during which the divider 43 is separated and the first burner 61 and the second burner 62 are simultaneously operated, and if the first flow rate modulating valve 610 or the second flow rate modulating valve 620 is open/closed at a maximum opening degree in the fourth mode and the fifth mode, the first flow rate modulating valve 610 and the second flow rate modulating valve 620 each may be open/closed at an opening degree smaller than the maximum opening degree in the first mode, the second mode, the third mode, and the sixth mode.

Thus, the amount of the gas being supplied to each burner during the first mode, the second mode, the third mode and the sixth mode may be less than the amount of the gas being supplied during the fourth mode and the fifth mode.

If a same amount of gas is supplied at all times at the time of ignition of the burners, in a case of a failure of the ignition, a large amount of gas may remain surrounding the burners, so that an explosive ignition may occur at the time of re-ignition.

Thus, the first flow rate modulating valve 610 and the second flow rate modulating valve 620 each are open at an opening degree less than the maximum opening degree at the time of an ignition of the burners 61 and 62, and thus an occurrence of an explosive ignition at the time of a re-ignition after a failure of the ignition may be prevented.

Referring to FIG. 7, when compared to the gas oven configured to modulate the amount of gas only by the ON/OFF controlling according to time under the condition that the ON/OFF cycle is not changed, the gas oven 1 in accordance with an embodiment of the present disclosure may be able to reduce a value of a difference "D" between a maximum temperature measured and a minimum temperature measured.

That is, when the measure temperature of the cooking cavity 40 exceeds a predetermined temperature, by gradually shutting off the flow rate modulating valves 61 and 62, the increasing rate of the measured temperature of the cooking cavity 40 is decreased, and thus the difference "D" between the maximum temperature measured and the minimum temperature measured may be reduced.

Figure 6:
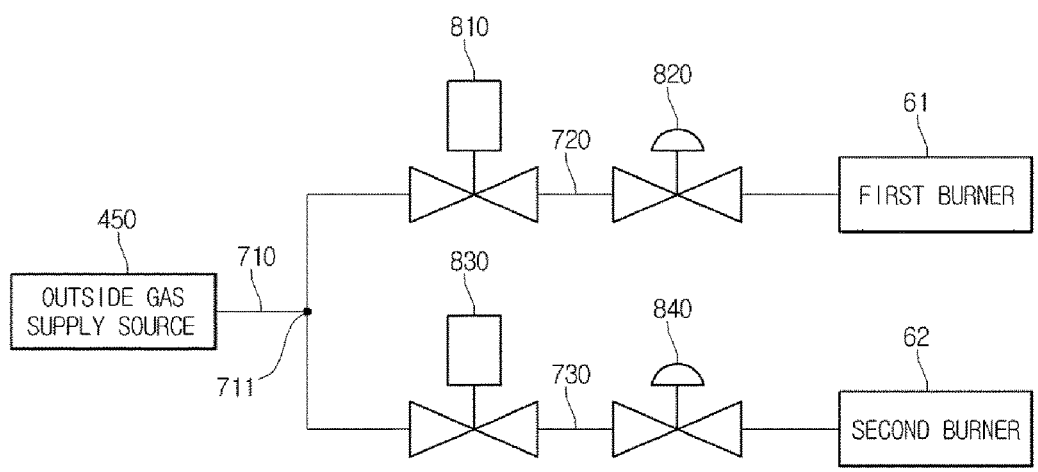
FIG. 6 illustrates a flow of the gas supply of a gas oven in accordance with an exemplary embodiment of the present disclosure.

FIG. 6 illustrates a flow of the supply of gas of a gas oven in accordance with an exemplary embodiment of the present disclosure. By referring to FIG. 6, the gas supplying passage and the valve system of the gas oven in accordance with the an exemplary embodiment of the present disclosure is described.

The gas supplying passage may include a common passage 710 connected to the outside gas supply source 450, a first passage 720 connected to the first burner 61 while being diverged from the common passage 710, and a second passage 730 connected to the second burner 62 while being diverged from the common passage 710.

At the first passage 720, a first ON/OFF valve 810, configured to allow or shut off the supply of gas, as well as a first flow rate modulating valve 820, capable of modulating an opening degree thereof, may be provided, and at the second passage 730, a second ON/OFF valve 830, configured to allow or shut off the supply of gas, as well as a second flow rate modulating valve 840 capable of modulating an opening degree thereof.

The first ON/OFF valve 810, the first flow rate modulating valve 820, the second ON/OFF valve 830, and the second flow rate modulating valve 840 may be controlled independent of one another. The first ON/OFF valve 810, the first flow rate modulating valve 820, the second ON/OFF valve 830, and the second flow rate modulating valve 840 may be solenoid valves.

The first ON/OFF valve 810 and the first flow rate modulating valve 820 may be connected to each other in series, and e the second ON/OFF valve 830 and the second flow rate modulating valve 840 may be connected to each other in series. Thus, the risk of an accident, which may be a result of a malfunction of a valve is effectively prevented by shutting off the supply of gas in a dual manner in a case when the supply of gas needs to be shut off. In addition, a phenomenon of a carbonization and undercooking of a food substance is prevented by a changing the opening degree of the first flow rate modulating valve 820 and the second flow rate modulating valve 840 according to the usage mode of the gas oven 1.

The prevention of the explosive ignition at the time of an ignition, as well as the reducing of the difference between the maximum temperature measured and the minimum temperature measured, is similar as the first embodiment of the present disclosure.

Figure 8:
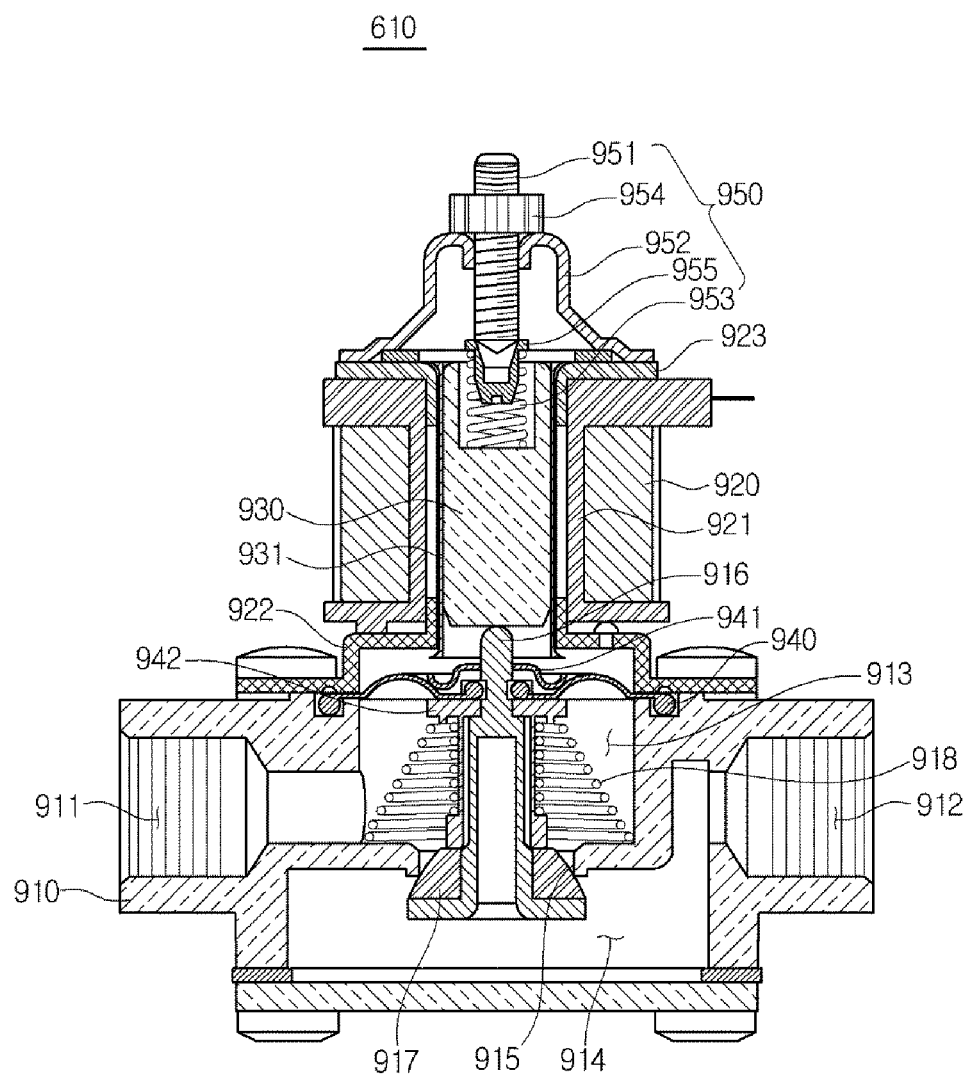
FIG. 8 illustrates an exemplary flow rate modulating valve of a gas oven.

FIG. 8 illustrates a flow rate modulating valve of the gas oven.

Referring to FIG. 8, an exemplary flow rate modulating valve in accordance with the an embodiments of the present disclosure is described. The flow rate modulating valve 610 includes a coil 920 wound in the form of a cylinder and configured to generate a magnetic field when applied with a current, a plunger 930 configured to move downward by the magnetic field, a valve body 916 configured to move downward by being pressed by the plunger 930 so as to modulate an opening degree of a connecting hole 915 that connects an inlet 911 to an outlet 912 according to the amount of movement thereof, and a restoring spring 918 configured to elastically support the valve body 916 to restore the position of the valve body 916 when the current applied to the coil 920 is removed.

The coil 920 may be wound around a bobbin 921 having the shape of a cylinder, and at the upper side and the lower side of the bobbin 921, a yoke 923 and a core 922 each forming a magnetic path may be respectively provided. When a current is applied to the coil 920, the core 922 is magnetized to pull the plunger 930 downward. The plunger 930 may be accommodated inside a plunger housing 931 configured to guide the movement of the plunger 930.

The valve body 916 may be supported while insertedly coupled to a diaphragm 940. The diaphragm 940 may be provided with an outer end portion thereof insertedly coupled between the core 922 and the valve housing 910. The diaphragm 940 may isolate a solenoid unit at an upper side from a valve unit at a lower side. The diaphragm 940 may be supported between an upper portion supporting panel 941 and a lower portion supporting panel 942.

The valve housing 910 includes an inlet chamber 913 connected to the inlet 911 and an outlet chamber 914 connected to the outlet 912, and the inlet chamber 913 and the outlet chamber 914 may be connected to each other through the connecting hole 915.

The connecting hole 915 is formed in a circular shape having a predetermined cross section, and the cross section of the connecting hole 915, that is, an opening degree, may be modulated according to the position of the valve body 916. For the above, at a lower end portion of the valve body 916, a packing 917 having the shape of a cone may be provided.

The flow rate modulating valve 610 includes an adjustment unit 950 configured to adjust the change of the opening degree of the connecting hole 915 according to the moving distance of the plunger 930 by adjusting the initial position of the plunger 930.

The adjustment unit 950 may include an adjustment bolt 951, an adjustment guide 952 to which the adjustment bolt 951 is coupled, and a buffer spring 953 configured to change the initial position of the plunger 930 according to the amount of coupling of the adjustment bolt 951.

The buffer spring 953 may be supported by an upper portion surface of the plunger 930 and a supporting cap 955 inserted into the adjustment bolt 951. A coupling nut 954 may be coupled to the adjustment bolt 951 to fix the adjustment bolt 951 after completing the adjustment of the adjustment bolt 951.

Accordingly, a user, by adjusting the position of the plunger 930 by use of the adjustment bolt 951 during an initial stage, may be able to adjust the moving distance of the plunger 930, that is, the change of the opening degree according to the amount of current that is applied to the coil 920.

According to an exemplary embodiment, when dividing a cooking cavity of a gas oven into a plurality of individual cooking cavities by using a divider, the amount of gas supplied to a burner may be reduced, so that the carbonization of a cooking substance may be prevented.

In a case when the gas supply to the burner is desired to be shut off, the supply of gas is shut off in a way that an ON/OFF valve and a flow rate modulating valve that are connected in series with each other are simultaneously shut off, and thus the safety thereof may be enhanced.

By gradually shutting off the flow rate modulating valve after the measured temperature of the cooking cavity exceeds a predetermined temperature, the difference in the measured temperature of the cooking cavity may be reduced.

The flow rate modulating valve may be provided with a modulation unit capable of modulating the initial position of a plunger, and thus the change of an opening degree may be modulated according to the moving distance of the plunger.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A gas oven, comprising:
a body;
a cooking space formed inside the body;
an insulated divider attachable to or detachable from the body and configured to divide the cooking space into a first individual cooking space at an upper portion of the body that is insulated from and a second individual cooking space at a lower portion of the body;
a first burner provided at the first individual cooking space;
a second burner provided at the second individual cooking space;
a main gas supply passage configured to supply gas from an outside gas supply source to the first burner and the second burner therethrough;
a first passage and a second passage diverged from the main gas supply passage to be connected to the first burner and to the second burner, respectively;
an ON/OFF valve provided at the main gas supply passage to control supply of the gas supplied from the outside gas supply source;
a first flow rate modulating valve provided at the first passage and configured to control supply of gas flowing through the first passage;
a second flow rate modulating valve provided at the second passage and configured to control supply of gas flowing through the second passage;
a main air discharging passage provided at the first individual cooking space and configured to discharge waste gas, generated from the first burner, from the first individual cooking space to outside of the gas oven; and
an auxiliary air discharging passage provided at the second individual cooking space, connected to the main air discharging passage, and configured to discharge waste gas, generated from the second burner, from the second individual cooking space to the outside through the main air discharging passage when the insulated divider is attached to the body.

2. The gas oven of claim 1, wherein:
each of the ON/Off valve, the first flow rate modulating valve, and the second flow rate modulating valve is a solenoid valve.

3. The gas oven of claim 1, wherein:
during ignition of the first burner or the second burner, the first flow rate modulating valve or the second flow rate modulating valve is open at smaller than a maximum opening to prevent an explosive ignition.

4. The gas oven of claim 1, wherein:
after a temperature measured at the first individual cooking space or the second individual cooking space exceeds a predetermined temperature, an opening of the first flow rate modulating valve or the second flow rate modulating valve is gradually shut off.

5. The gas oven of claim 1, wherein each of the first flow rate modulating valve and the second flow rate modulating valve comprises:
a coil wound in a form of a cylinder and configured to generate a magnetic field when applied with a current;
a plunger configured to move downward by the magnetic field;
a valve body configured to move downward while being pressed by the plunger to adjust an opening degree of a connecting hole that connects an inlet to an outlet according to an amount of movement thereof;
a restoring spring configured to elastically support the valve body to restore a position of the valve body when the current applied to the coil is removed; and
an adjustment unit configured to adjust a change of the opening degree according to a moving distance of the plunger by adjusting an initial position of the plunger.

6. The gas oven of claim 5, wherein:
the adjustment unit comprises an adjustment bolt, an adjustment guide to which the adjustment bolt is coupled, and a buffer spring provided between the adjustment bolt and the plunger to change the initial position of the plunger according to an amount of the coupling of the adjustment bolt.

7. A gas oven, comprising:
a body;
a cooking space formed inside the body;
a divider attachable to or detachable from the body and to divide the cooking space into a first individual cooking space at an upper portion of the body and a second individual cooking space at a lower portion of the body;
a first burner provided at the first individual cooking space;
a second burner provided at the second individual cooking space;
a supply passage configured to supply gas from an outside gas supply source to the first burner and the second burner therethrough;
a first passage and a second passage diverged from the main gas supply passage to be connected to the first burner and to the second burner, respectively;
an ON/OFF valve provided at the main gas supply passage to control supply of the gas supplied from the outside gas supply source;
a first flow rate modulating valve provided at the first passage and configured to control supply of gas flowing through the first passage;
a second flow rate modulating valve provided at the second passage and configured to control supply of gas flowing through the second passage,
a main air discharging passage provided at the first individual cooking space and configured to discharge waste gas, generated from the first burner, from the first individual cooking space to outside of the gas oven; and
an auxiliary air discharging passage provided at the second individual cooking space, connected to the main air discharging passage, and configured to discharge waste gas, generated from the second burner, from the second individual cooking space to the outside through the main air discharging passage when the divider is attached to the body,
wherein the gas oven has a first mode during which the divider is attached to the body and only the first burner is operated, a second mode during which the divider is attached to the body and only the second burner is operated, a third mode during which the divider is attached to the body and the first burner and the second burner are simultaneously operated, a fourth mode during which the divider is detached from the body and only the first burner is operated, a fifth mode during which the divider is detached from the body and only the second burner is operated, and a sixth mode during which the divider is detached from the body and the first burner and the second burner are simultaneously operated.

8. The gas oven of claim 7, wherein:
in the fourth mode and the fifth mode, the first flow rate modulating valve or the second flow rate modulating valve is open/closed at a maximum opening, and
in the first mode, the second mode, the third mode, and the sixth mode, the first flow rate modulating valve and the second flow rate modulating valve each are open/closed at an opening smaller than the maximum opening.

9. A gas oven, comprising:
a body;
a cooking space inside the body;
an insulated divider attachable to or detachable from the body and configured to divide and insulate the cooking space into a first individual cooking space at an upper portion of the body and a second individual cooking space at a lower portion of the body;
a first burner provided at the first individual cooking space;
a second burner provided at the second individual cooking space;
a main gas supply passage configured to supply gas from an outside gas supply source to the first burner and the second burner therethrough;
a first passage and a second passage diverged from the main gas supply passage to be connected to the first burner and the second burner, respectively;
a first ON/OFF valve provided at the first passage to control supply of the gas supplied from the main gas supply passage;
a first flow rate modulating valve provided at the first passage and configured to control supply of gas flowing through the first passage;
a second ON/OFF valve provided at the second passage to control supply of the gas supplied from the main gas supply passage;
a second flow rate modulating valve provided at the second passage and configured to control supply of gas flowing through the second passage;
a main air discharging passage provided at the first individual cooking space and configured to discharge waste gas, generated from the first burner, from the first individual cooking space to outside of the gas oven; and
an auxiliary air discharging passage provided at the second individual cooking space, connected to the main air discharging passage, and configured to discharge waste gas, generated from the second burner, from the second individual cooking space to the outside through the main air discharging passage when the insulated divider is attached to the body.

10. The gas oven of claim 9, wherein:
each of the first ON/Off valve, the first flow rate modulating value, the second ON/OFF valve and the second flow rate modulating valve is a solenoid valve.

11. A gas oven, comprising:
a body;
a cooking space formed inside the body;
an insulated divider attachable to or detachable from the body and configured to divide the cooking space into a first portion and a second portion;
a burner provided at the cooking space;
a supply passage configured to supply gas from an outside gas supply source to the burner therethrough;
a ON/OFF valve provided at the supply passage to control supply of the gas supplied from the outside gas supply source and configured to open/shut off the supply passage;
a flow rate modulating valve provided at the supply valve so as to be connected in series with the ON/OFF valve and configured to control supply of gas flowing through the supply passage;
a main air discharging passage provided at the first individual cooking space and configured to discharge waste gas, generated from the burner, from the first portion to outside of the gas oven; and
an auxiliary air discharging passage provided at the second individual cooking space, connected to the main air discharging passage, and configured to discharge waste gas, generated from the burner, from second portion to the outside thorugh the main air discharging passage when the insulated divider is attached to the body.

12. The gas oven of claim 11, wherein:
each of the ON/OFF valve and the flow rate modulating valve is a solenoid valve.
13. The gas oven of claim 12, wherein:
during ignition of the burner, the flow rate modulating valve is open at an opening smaller than a maximum opening to prevent explosive ignition.
14. The gas oven of claim 12, wherein:
after a temperature measured at the cooking space exceeds a predetermined temperature, the opening of the flow rate modulating valve is gradually shut off.

* * * * *